Patented July 28, 1942

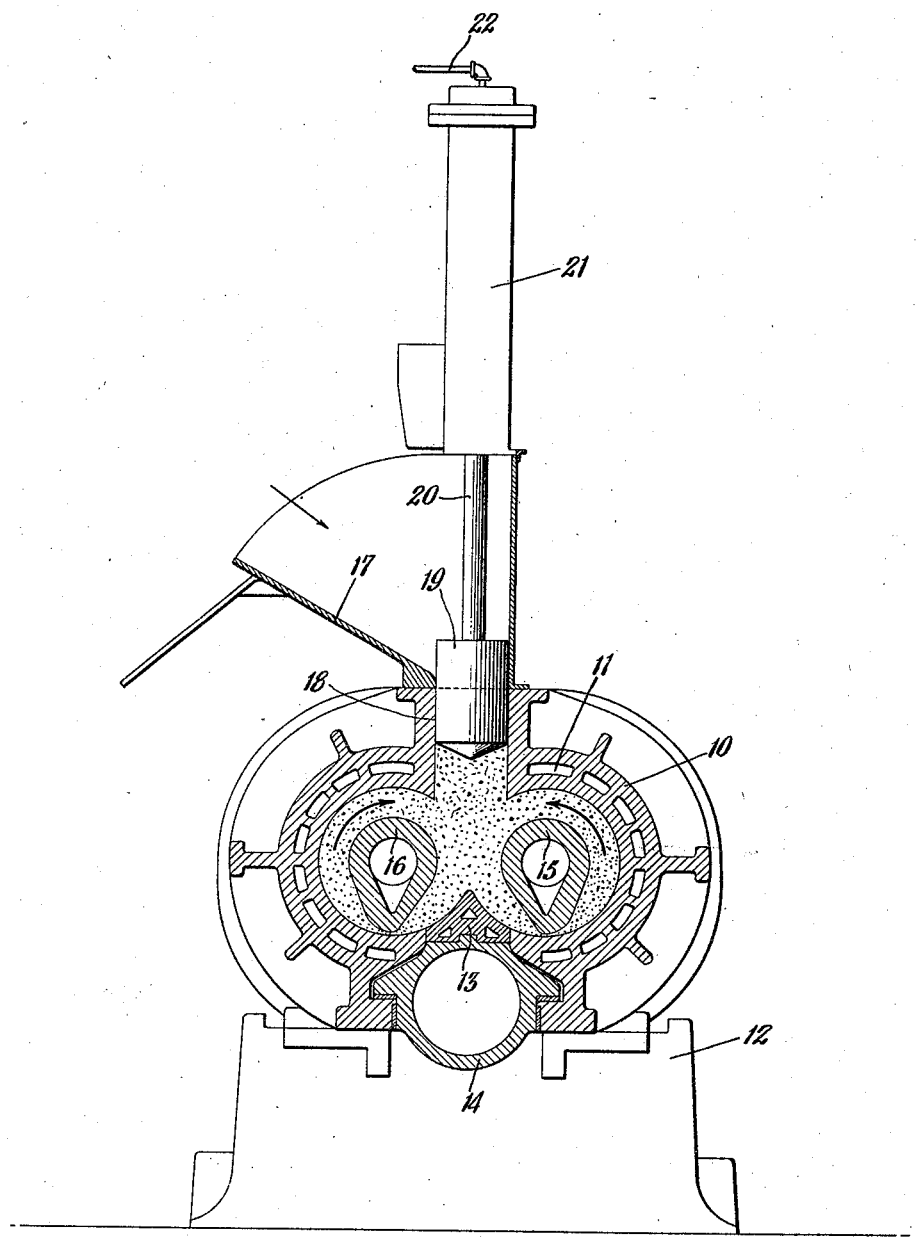
INVENTOR
HIRSCH MACHLIN

2,290,914

UNITED STATES PATENT OFFICE 2,290,914

COATED PIGMENT AND THE PREPARATION THEREOF

Hirsch Machlin, New York, N. Y.

Application July 17, 1939, Serial No. 284,926

18 Claims. (Cl. 106—308)

This invention relates to coated pigments and the production thereof, and more particularly to the production of coated pigments especially suitable for use in paints, varnish, lacquers, rubber, linoleum and the like.

The coating of various pigment particles has been proposed heretofore by grinding or mixing pigment and coating material together to improve the properties of the pigment when mixed with a paint vehicle, rubber and the like, and particularly for converting inexpensive pigments such as whiting or the like into high grade products suitable for a wide variety of uses.

Such coating processes as have been proposed, however, have required long and relatively expensive treatments in relation to the improvement in the pigments and have involved prolonged dry or wet grinding of the pigment and coating agent, requiring from several hours up to 10 to 12 hours, or longer.

An object of my invention is to provide a process of coating pigments quickly and efficiently by a procedure requiring only a few minutes.

A further object of my invention is to coat pigments by subjecting a substantially dry mixture of the pigment with a small proportion of a coating agent to a thorough mulling under superatmospheric pressure.

Another object of my invention is to provide improved coating agents for pigments and improved pigments coated with such agents.

Another object is the coating of pigments with a gelled drying or semi-drying oil to produce a product having distinct advantages for use in paints, varnish, lacquers, enamels, rubber, linoleum, etc.

One form of apparatus suitable for carrying out my invention is illustrated in the drawing in vertical cross section. This apparatus is known as "Banbury Mixer" and has been used for mixing rubber stock and in the manufacture of linoleum as well as various other liquid, semi-liquid or pasty materials.

The apparatus comprises essentially a double cylindrical mixing barrel 10, which may be provided with suitable openings 11 for the circulation of steam, water or other fluid used for temperature control. The barrel of the mixer may be supported on a suitable base 12 and provided near its bottom with a longitudinal ridge 13 supported on a suitable casting 14. Ridge 13 and casting 14 are removable longitudinally at the end of a given operation for discharging the treated product from the mixing apparatus. Suitable levers or other mechanism for sliding the casting 14 and ridge 13 back and forth may be provided.

Inside the mixing barrel are a pair of rotors 15 and 16 mounted for rotation and positively driven in opposite directions. These rotors may be hollow for temperature control and are preferably pear-shaped in cross section and formed longitudinally with an uninterrupted spiral to assist the mixing action. They are preferably driven at different speeds to provide a constant and continuous circulation of the material being worked in the mixer.

Raw materials to be mixed may be fed into the machine by means of the hopper 17 from which they drop through the inlet opening 18 into the mixing barrel 10. A ram 19 carried on a shaft 20 is fitted into the opening 18 for applying pressure on the charge in the barrel 10. The ram may be weighted or equipped with a cylinder 21 for forcing the ram downward by means of compressed air or the like supplied through the pipe 22.

I have discovered that a superior product may be obtained in a relatively few minutes by subjecting a mixture of finely divided pigment and a small proportion of a suitable coating agent to the mulling and mixing action of such an apparatus while compressing the mixture under a substantial pressure. Other forms of apparatus might be employed for performing this coating operation utilizing the same principles of compressing the mixture and subjecting it to mulling while under such pressure.

In the operation of the apparatus illustrated in the drawing for coating pigments, the charge may consist of any suitable pigment to be coated, such as natural or artificial whiting ground to a suitable state of subdivision and roughly mixed with about 0.1 to 10% of a coating agent. This charge is introduced into the mixer and the ram 19 is then lowered until it rests directly on the charge forcing it down and compacting it in the mixing barrel 10.

It is important to avoid the trapping of air or other gases in the mixing barrel, and for this purpose a pipe or other conduit may be associated with the ram 19 or the interior of the mixing barrel 10 to withdraw any air trapped in there by the initial application of the ram. If a provision of this sort is not made, the mixer should be operated for a few minutes with the ram in place in order to allow air in the mixing barrel to work its way out. In referring to specific pressures herein, the pressure of the ram directly on the compacted charge is meant.

I have found that the time of mixing varies primarily with the pressure applied by the ram. With higher pressures the time of mixing may be reduced. Any suitable pressures may be employed up to 100 lbs. per square inch, although usually pressures of 2 to 50 lbs. per square inch are sufficient. Pressures higher than 100 lbs. per square inch may be employed but provide little if any advantage over the use of lower pressures. The time of mixing with such pressures will depend upon the particular pressure employed, the quality of the product desired, and the nature and amount of the coating material being applied. Under very high pressures, satisfactorily coated pigments may be produced by mixing for only 30 seconds. With 10 lbs. pressure excellent results are obtained by mixing for only three to six minutes without the application of any external heat. Heat may be applied if desired, although this does not greatly affect the results obtained unless the coating material is one which is rendered more fluid by the heat.

By reason of the pressure on the charge and the operation of the rotors 15 and 16 embedded therein, the compact mass of individual particles is forced to rub one against the other, producing a thorough mixing and mulling action which provides proper distribution of the coating material in an extremely thin layer on and around each individual pigment particle.

While the usual coating materials such as rosin, stearic acid and the like may be employed, I prefer to use a coating agent consisting of a gelled drying or semi-drying oil, either alone or having incorporated in it a natural or artificial resinous material.

Such a coating agent may be made by polymerizing a drying or semi-drying vegetable oil in any suitable manner. For example, polymerization of a drying oil may be carried out by simply heating the oil in an open container to a temperature of around 450° to 650° F. until the oil is converted to a tough, stringy, rubbery gel. The various drying or semi-drying oils which may be gelled for this purpose include China-wood oil, linseed oil, oiticica oil, Perilla oil and the like.

Various catalysts or reacting materials may be employed in conjunction with the polymerization, including heating the oil with such materials as litharge, zinc oxide, hydrated lime or various metal chlorides. The oil may also be heated in the presence of air or in the presence of inert or other gases.

Various other ways of producing a gelled oil may be employed such as heating or reacting the oil with a polymerizing agent such as maleic anhydride, sulfuric acid, sulfur, sulfur-monochloride, stannic chloride, ozone, phosphorous pentoxide or an organic amine such as aniline or benzidine. Various other oils such as oils of animal or mineral origin and even non-drying oils may be gelled to a degree suitable for purposes of my invention by such a treatment.

The oil is preferably gelled or polymerized to a stage at which it is most stable and most resistant to oxidation, dilute alkali, dilute acid or other chemicals and solvents. If the gelling reaction is effected by condensation or polymerization, the oil is preferably converted to the highest molecular weight that can be obtained by this type of reaction.

Such a gelled oil may be employed as a coating agent alone or may be mixed with and heated with natural or synthetic resins. For this purpose, such materials as ester gum, gum elemi, gum dammar or any of the well known condensation products such as the phthalic anhydride—glycerol, phenol-formaldehyde, or urea-formaldehyde resins, or other similar materials may be incorporated in the gel.

Specific examples of coating agents produced for coating pigments in accordance with my invention are given as illustrating the invention.

*Example I.*—100 lbs. of liquid oiticica oil was heated in an open container at 600° F. for 30 minutes. After cooling, the oil was found to have gelled to produce a tough, stringy, tacky gel having a reddish color, and suitable for use as a coating agent. Normally solid oiticica oil can also be used with similar results.

*Example II.*—100 lbs. of China-wood oil was heated to 575° F. and held heated in an open container for 8 to 10 minutes when the first signs of stringiness appeared as evidenced by dipping a paddle in the oil and lifting some of the product out of the mass. At the end of this time, 50 lbs. of ester gum, 5 lbs. of rosin and 2 lbs. of litharge were quickly added to the oil and the mixture was allowed to cool naturally. If desired, the ester gum, rosin and litharge may be added to the oil before gelling, i. e., before the oil is heated to the gelling temperature. A tough, stringy gel similar to that in Example I was thus obtained.

*Example III.*—100 lbs. of Perilla oil was heated at 600° F. until it began to gel, which required about 4 hours. At the end of this time, 25 lbs. of ester gum and 50 lbs. of dammar gum were quickly added and the mixture was allowed to cool after the addition had been completed.

*Example IV.*—100 lbs. of linseed oil was heated to a temperature of 600 to 610° F. for 10 hours when the oil began to thicken and string from a paddle and to form a tough, stringy, rubbery button on a cold surface. At the end of this time, 25 lbs. of linseed oil fatty acids and 10 lbs. of lead linoleate were added and the mixture was allowed to cool after the addition had been completed.

*Example V.*—A mixture of 90 lbs. of glycerol and 300 lbs. of phthalic anhydride were heated to produce a clear solution at a temperature approaching but not exceeding 450° F. 75 lbs. of phthalic anhydride and 150 lbs. of linseed oil fatty acids were then added and heating at 450° F. was continued until the mass had gelled to produce a tough, rubbery mass.

The foregoing materials were found to provide excellent coatings for pigments such as whiting, titanium dioxide, and the like when mixed with a pigment as previously described by a mulling operation under pressure. As small quantities as 0.1% of the coating agent mixed with the pigments were found to produce noticeable improvements in the properties of the pigment when subsequently used for paints, lacquers, enamels, etc.

If more than 10% of a coating agent is mixed with the pigment, the mixture loses its dry character and appearance, the mixing operation is rendered more difficult, and the desired thin coating on the pigment particles is not obtained. For most purposes, the mixing of pigments with from 0.1 or 1 to 5% of the coating agent is satisfactory.

Specific examples of the mixing operations are as follows:

(A) 100 parts of limestone whiting were put into the barrel 10 of the mixer shown in the drawing together with 3 parts of the gelled oiticica oil obtained as described above in Example I. The rotors of the machine were then started and the ram was pushed down on the charge to provide a pressure thereon of about 15 lbs. per square inch. After operation of the machine for 3 to 6 minutes at this average pressure, the product was discharged. During mixing, water was circulated through the machine for cooling, but in spite of this cooling, the final temperature of the mix rose about 25 to 30° C. above room temperature. The coated product thus obtained was increased in sheen, its color was improved and its specific gravity was lowered, the pigment appearing fluffier and more readily flowable than in its uncoated condition. The coated pigment was also wetted much easier and quicker by organic solvents, varnishes, etc. than in the uncoated state.

When such a pigment is incorporated into a paint or enamel, it is found that the paint or enamel provides a surface coating, even on such a porous material as newsprint, without being absorbed by the under surface or striking through. The weather proofness and resistance to the action of dilute acid and alkalies of the paint film is also improved as compared with a paint film containing uncoated pigments.

(B) 100 parts of whiting was put into the mixing barrel and the rotors of the machine were started. One part of the gelled oil obtained according to Example III was then added directly to the whiting which was then mixed. The ram was then lowered to provide a direct pressure of 7 to 10 lbs. per square inch on the charge. Mixing under this pressure for 5 to 10 minutes was found to be sufficient to produce a highly satisfactory product.

(C) Whiting mixed with 2% of rosin was mixed under 10 lbs. per square inch pressure for 3 to 6 minutes in the "Banbury" mixer and the product thus obtained was found to be superior to whiting mixed with the same proportion of the same coating material in a ball mill for several hours.

The pigments coated in accordance with my invention have the chemical properties of the coating agent instead of the properties of the original pigment. For example, coated titanium dioxide used in paint provides a coated or painted surface which has much less chalking tendency than a coating made with uncoated titanium dioxide in the same vehicle.

A paint film obtained with pigments coated in accordance with my invention are noticeably glossier, and because of their improved qualities, such pigments require a minimum of grinding to produce a good suspension in paint. With colored pigments such as chrome green, the coating minimizes fading of the pigment, and coated pigments in general can be used in larger amounts than the uncoated pigments, thus producing a more highly pigmented surface in the final paint film. These coated pigments also are substantially improved for use in such materials as linoleum or rubber, being more easily dispersed into the vehicle and providing a final product that is stronger than when made with an uncoated pigment.

It will be apparent that my invention makes it possible to convert economically low grade pigments into superior products adapted for a much wider variety of uses.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:

1. A process of coating an organic pigment to produce a substantially dry, free flowing product comprising mulling a mixture of said pigment with 0.1 to 10% by weight of a coating agent that forms adherent coating layers on the pigment particles which alter substantially the properties of the pigment, under a pressure substantially above atmospheric pressure applied directly on the mixture.

2. A process of coating an organic pigment to produce a substantially dry, free flowing product comprising mulling a mixture of said pigment with 1 to 5% by weight of a coating agent that forms adherent coating layers on the pigment particles which alter substantially the properties of the pigment, under a pressure substantially above atmospheric pressure applied directly on the mixture.

3. A process of coating a pigment to produce a substantially dry, free flowing product comprising mulling a mixture of said pigment with 0.1 to 10% by weight of a gelled oil as a coating agent under a pressure substantially above atmospheric pressure applied directly on the mixture.

4. A process of coating a pigment comprising intimately grinding and mixing the pigment under superatmospheric pressure with 0.1 to 10% by weight of a coating agent comprising a gelled oil to produce thin uniform coating layers of said agent around the individual particles of said pigment.

5. A process for preparing coated pigments for use in paints, lacquers, rubber, linoleum and the like comprising converting an oil of the class consisting of vegetable drying and semi-drying oils to a gel insoluble in a paint vehicle, and mixing and grinding finely divided pigment with about 0.1 to 10% of said gel to coat the individual particles of said pigment with thin layers thereof.

6. A process of coating finely divided pigment with an insoluble organic coating agent to produce a product consisting of discrete particles of coated pigment comprising compressing a substantially solid mixture of the pigment with about 0.1 to 10% of said coating agent under a superatmospheric pressure, and mulling and mixing said mixture while under said pressure.

7. A process of coating finely divided pigment with an insoluble organic coating agent to produce a product consisting of discrete particles of coated pigment comprising compressing a substantially solid mixture of the pigment with about 0.1 to 10% of said coating agent under a superatmospheric pressure, and subjecting said mixture while under said pressure to the mixing and mulling action of a plurality of irregularly shaped rotating members.

8. A process of coating finely divided pigment with a coating agent comprising a gelled oil including the steps of compressing a mixture of said pigment with about 0.1 to 5% of said coating agent under a pressure substantially above atmospheric pressure, and subjecting said mixture while under said pressure to the mixing and mulling action of a plurality of irregularly shaped rotating members.

9. A process of coating finely divided pigment with an insoluble organic coating agent to produce a product consisting of discrete particles of coated pigment comprising compressing a substantially solid mixture of the pigment with about 0.1 to 10% of said coating agent under a pressure of about 2 to 50 pounds per square inch, and subjecting said mixture while under said pressure to the mixing and mulling action of a plurality of irregularly shaped members embedded and rotated therein.

10. A process of coating pigments comprising mulling a mixture of finely divided pigment with 0.1 to 10% of an organic coating agent that forms adherent coating layers on the pigment particles which alter substantially the properties of the pigment, while under a pressure of about 2 to 50 pounds per square inch to produce a substantially dry, free flowing mixture of discrete pigment particles individually coated with said agent.

11. A process of coating pigments comprising mulling a mixture of finely divided pigment with 0.1 to 10% of a coating agent comprising a gelled oil while under a pressure of about 2 to 50 pounds per square inch to produce a substantially dry, free flowing mixture of discrete pigment particles individually coated with thin layers of said gelled oil.

12. A process of coating pigments to improve their properties for use in paints, lacquers, rubber, linoleum and the like comprising intimately mixing and grinding finely divided pigment under superatmospheric pressure with about 0.1 to 10% by weight of a coating agent comprising an unsaturated oil selected from the class consisting of drying and semi-drying oils which is polymerized to form a gel, said mixing and grinding being continued until a dry, free flowing product consisting of discrete pigment particles coated with thin layers of said coating agent is obtained.

13. A process of coating pigments to improve their properties for use in paints, lacquers, rubber, linoleum and the like comprising intimately mixing and grinding finely divided pigment with about 0.1 to 10% by weight of a coating agent comprising a gelled oil prepared by heating an unsaturated vegetable oil for a sufficient time at a high enough temperature to convert said oil into a tough, stringy, rubbery mass, said mixing and grinding being continued until a dry, free flowing product consisting of discrete pigment particles coated with thin layers of said coating agent is obtained.

14. A process of coating pigments to improve their properties for use in paints, lacquers, rubber, linoleum and the like comprising intimately mixing and grinding finely divided pigment under superatmospheric pressure with about 0.1 to 10% by weight of a coating agent comprising a product obtained by polymerizing an unsaturated vegetable oil to form a gel, said gel having a resinous material incorporated therein, said mixing and grinding being continued until a dry, free flowing product consisting of discrete pigment particles coated with thin layers of said coating agent is obtained.

15. Coated pigment comprising substantially dry, free flowing finely divided particles of pigment coated with thin encasing layers of a coating agent comprising a gelled oil.

16. Coated pigment comprising substantially dry, free flowing finely divided particles of pigment coated with thin encasing layers of a coating agent comprising an unsaturated vegetable oil converted to a gel by polymerization.

17. Coated pigment comprising substantially dry, free flowing finely divided particles of pigment coated with thin encasing layers of a coating agent comprising a gelled oil having a resinous material incorporated therein.

18. Coated pigment comprising substantially dry, free flowing finely divided particles of pigment coated with thin encasing layers of a coating agent comprising an oil selected from the class consisting of drying and semi-drying oils which has been heated for a sufficient time and at a sufficient temperature to form a tough stringy gel.

HIRSCH MACHLIN.

CERTIFICATE OF CORRECTION.

Patent No. 2,290,914.  July 28, 1942.

HIRSCH MACHLIN.

It is hereby certified that error appears in the printed specification of the above numbered patent requiring correction as follows: Page 1, first column, line 40, after the words "known as" insert --a--; and second column, line 8, for "uninterrupted" read --interrupted--; page 2, second column, line 50, for "edded" read --added--; and that the said Letters Patent should be read with this correction therein that the same may conform to the record of the case in the Patent Office.

Signed and sealed this 29th day of September, A. D. 1942.

(Seal)

Henry Van Arsdale,
Acting Commissioner of Patents.